UNITED STATES PATENT OFFICE.

STANISLAUS J. HON, OF SOUTH BEND, INDIANA.

ARTIFICIAL FUEL AND PROCESS FOR MAKING SAME.

No. 820,196.  Specification of Letters Patent.  Patented May 8, 1906.

Application filed October 6, 1905. Serial No. 281,628.

*To all whom it may concern:*

Be it known that I, STANISLAUS J. HON, a citizen of the United States, residing at South Bend, in the county of St. Joseph and State of Indiana, have invented new and useful Improvements in Artificial Fuel and Processes for Making Same, of which the following is a specification.

The object of this invention is to provide a new artificial or manufactured fuel which will be comparatively inexpensive to manufacture, which will burn with greater heat than natural fuel, and all its ingredient elements will be practically consumed, producing no clinkers and leaving a residue formed into a fine ash; and, further, the invention comprehends an improved process of making an artificial fuel.

In carrying out my invention I employ a predominant body element, such as earth. This is mixed with a compound consisting of crude oil, rosin, oxid of lead, and ground iron ore. The crude oil, rosin, oxid of lead, and ground iron ore are first mixed and heated so as to reduce the whole into liquid form. This compound is then added to the earth, so as to give the mass a putty-like consistency. It is formed into briquets of suitable size which are allowed to harden. The proportions of the ingredient elements are as follows: Crude oil, thirteen gallons; rosin, five gallons; oxid of lead, five pounds, and ground iron ore thirteen pounds. These ingredients are mixed with two thousand pounds of earth.

The earth provides a fuel-supporting core to prevent the fuel fusing together during ignition. The crude oil establishes the combustible properties of the fuel, and the rosin has similar properties and further acts as a binder. The oxid of lead hastens the drying process as the briquets are formed and the ground iron ore gives a hard body to the briquets.

In the amalgamating process differences may be made in the proportions and in the manner of combining the compost, so that the resultant product might be somewhat changed, and therefore I do not restrict myself to the specific proportions stated.

Having thus described my invention, what I claim, and desire to secure by Letters Patent, is—

1. An artificial fuel consisting of earth, crude oil, rosin, oxid of lead and ground iron ore.

2. An artificial fuel consisting of earth, two thousand pounds, crude oil thirteen gallons, rosin five gallons oxid of lead five pounds and ground iron ore thirteen pounds.

3. The process of making an artificial fuel which consists in mixing crude oil, rosin, oxid of lead and ground iron ore and heating the mixture until it is reduced to liquid form, then adding earth to the first-mentioned mixture to reduce the whole to a putty-like consistency, and then forming the mass into the briquets, substantially as set forth.

In testimony whereof I affix my signature in presence of two subscribing witnesses.

STANISLAUS J. HON.

Witnesses:
 GEORGE OLTSCH,
 FRANK J. DRAVES.